United States Patent
Nanavati et al.

(10) Patent No.: US 7,856,435 B2
(45) Date of Patent: Dec. 21, 2010

(54) SELECTING KEYWORDS REPRESENTATIVE OF A DOCUMENT

(75) Inventors: Amit A. Nanavati, New Delhi (IN); Chinmoy Dutta, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/015,119

(22) Filed: Jan. 16, 2008

(65) Prior Publication Data

US 2008/0133509 A1 Jun. 5, 2008

Related U.S. Application Data

(62) Division of application No. 10/954,899, filed on Sep. 30, 2004, now abandoned.

(51) Int. Cl.
*G06F 17/30* (2006.01)

(52) U.S. Cl. .................................. 707/722; 707/736

(58) Field of Classification Search ............. None
See application file for complete search history.

(56) References Cited

U.S. PATENT DOCUMENTS

| | | | | |
|---|---|---|---|---|
| 5,842,217 | A * | 11/1998 | Light | 1/1 |
| 6,094,650 | A | 7/2000 | Stoffel et al. | |
| 6,338,057 | B1 * | 1/2002 | Weeks | 1/1 |
| 6,598,043 | B1 | 7/2003 | Baclawski | |
| 6,675,159 | B1 | 1/2004 | Lin et al. | |
| 6,766,316 | B2 | 7/2004 | Caudill et al. | |
| 6,772,148 | B2 | 8/2004 | Baclawski | |
| 6,804,670 | B2 * | 10/2004 | Kreulen et al. | 1/1 |
| 6,823,331 | B1 * | 11/2004 | Abu-Hakima | 1/1 |
| 7,526,425 | B2 * | 4/2009 | Marchisio et al. | 704/9 |
| 2002/0059289 | A1 | 5/2002 | Wenegrat et al. | |
| 2002/0078090 | A1 | 6/2002 | Hwang et al. | |
| 2003/0050908 | A1 * | 3/2003 | Kreulen et al. | 707/1 |
| 2003/0154189 | A1 | 8/2003 | Egilsson et al. | |
| 2003/0177112 | A1 | 9/2003 | Gardner | |
| 2003/0212673 | A1 | 11/2003 | Kadayam et al. | |
| 2004/0103090 | A1 * | 5/2004 | Dogl et al. | 707/3 |
| 2004/0243645 | A1 | 12/2004 | Broder et al. | |
| 2005/0267871 | A1 * | 12/2005 | Marchisio et al. | 707/3 |
| 2009/0271179 | A1 * | 10/2009 | Marchisio et al. | 704/9 |

OTHER PUBLICATIONS

Arie Tamir, "An $O(pn^2)$ Algorithm for the P-Median and Related Problems on Tree Graphs", 1996, Operations Research Letters 19 (1996) 59-64.

(Continued)

*Primary Examiner*—James Trujillo
*Assistant Examiner*—Hubert Cheung
(74) *Attorney, Agent, or Firm*—Gibb I.P. Law Firm, LLC; Derek S. Jennings (57) ABSTRACT

The method makes use of a given ontology to select keywords representative of a given document. The method finds all the terms in an ontology that occur in a document, and computes their frequency of occurrences in the document. The method then propagates these values from the leaves upwards to the root of the ontology during which it weights them. The method then selects a subset of terms of the ontology structure as keywords representative of the document based on these weights.

3 Claims, 7 Drawing Sheets

OTHER PUBLICATIONS

Anette Hulth et al. "Automatic Keyword Extraction Using Domain Knowledge", Proceedings of the second International Conference on Computational Linguistics and Intelligent Text Processing (AIALing 2001). Mexico City, Feb. 2001. LNCS 2004, Springer.

Plaunt et al, "An Association Based Method for Automatic Indexing with a Controlled Vocabulary", Journal of the American Society of Information Science, 49 (10), 888-902, 1998.

Kagegeura et al. "Methods of Automatic Term Recognition", Terminology, 3(2), 589-289, 1996.

Tiun et al., "Automatic Topic Identification Using Ontology Hierarchy", Proceedings of the Second International Conference on Computational Linguistics and Intelligent Text Processing, 444-453, 2001.

* cited by examiner

SELECTING KEYWORDS REPRESENTATIVE OF A DOCUMENT

CROSS-REFERENCE TO RELATED APPLICATIONS

This Application is a division of U.S. patent application Ser. No. 10/954,899, filed Sep. 30, 2004, now abandoned.

FIELD OF THE INVENTION

The present invention relates to a method of selecting keywords representative of a document from an ontology. The invention also relates to a computer program product comprising code means for implementing the steps of the method, and a computer system for performing the steps of the method.

BACKGROUND

Traditionally, a major tool in searching collections of documents has been the use of indexing. Indexing is the practice of establishing correspondences between a set of keywords or index terms and individual documents or sections thereof. Keywords are meant to indicate the topic or the content of the text, where the set of terms of keywords is chosen to reflect the topical structure of the collection, such as it can be determined. Typically, indexing is done manually by persons who read documents and assign keywords to them. Manual indexing is often both difficult and dull; it poses great demands on consistency from indexing session to indexing session and between different indexers. It is the sort of job that is a prime candidate for automation. Automating human performance is never trivial, however, even when the task at hand may seem repetitive and non-creative at first glance. Manual indexing is a quite complex task, and difficult to emulate by computers.

Relatively recently, automatic indexing methods have been proposed. Some of these methods are based on Learning, Training, Collocation (window of text). Others use both documents and ontological structure(s) as information sources in order to select the keywords. However, all these methods suffer from the drawback in that they do not consistently select keywords that are most representative of the documents.

SUMMARY

The methods of the invention make use of a given ontology to select keywords representative of a given document. The methods find all the terms in an ontology that occur in a document, and computes their frequency of occurrences in the document. The methods then select a subset of terms of the ontology structure as keywords for the document based on these frequency of occurrence values. In this fashion, given a document D and a domain ontology O (taxonomy), the method assigns (selects) k representative keywords from the ontology to the document.

The method in accordance with a first arrangement, computes the frequency of occurrences of all the terms of the ontology that occur in the document and assigns these frequency of occurrence values to corresponding vertices in the ontology structure. The first arrangement then propagates these frequency of occurrence values from the leaves upwards to the root of the ontology structure, during which it weights them with a propagation factor. The first arrangement then outputs the words of the ontology structure having the k largest values as the keywords representative of the document.

The method in accordance with a second arrangement, computes the frequency of occurrences of all the terms of the ontology that occur in the document and assigns these frequency of occurrence values to corresponding vertices in the ontology structure. The second arrangement then propagates these frequency of occurrence values from the leaves upwards to the root of the ontology structure, during which it weights them with a propagation factor. The second arrangement then selects a sub-structure of the ontology structure, which sub-structure comprises a set of unique paths from the root to the terms having non-zero weights. This selection step disambiguates the context of these terms. The second arrangement then performs an optimization sub-process, where k vertices are selected such that a sum of weighted distances of all the vertices having non-zero weights to associated selected k vertices is minimized. The k terms associated with these selected k vertices are selected as keywords representative of the document.

The method in accordance with a third arrangement, computes the frequency of occurrences of all the terms of the ontology that occur in the document and assigns these frequency of occurrence values to corresponding vertices in the ontology structure. The third arrangement then performs an optimization sub-process, where k vertices are selected such that a sum of weighted distances of all the vertices having non-zero weights to associated selected k vertices is minimized. The k terms associated with these selected k vertices are selected as keywords representative of the document.

The methods in accordance with the first, second and third arrangements make use of domain ontology, and generate ontology dependent keywords. These approaches provide for the selection of keywords from the ontology structure that are representative of the document but are not necessarily in the document themselves. Such ontologies are typically created and agreed upon by experts and are therefore "standardized". Furthermore, the methods in accordance with the arrangements can be used to pipeline with other domain dependent analysis, which uses the same ontology. Since the methods in accordance with the arrangements do not rely on NLP-based techniques, they do not suffer from the limitations of such approaches. In addition, the present methods explicitly exploit the structure of an ontology in order to consistently select the keywords.

Another advantage of these approaches is that one can plug in different ontologies. In addition, the methods in accordance with the arrangements support various ontology structures, such as: Directed Acyclic Graphs (DAGs), Collection of Trees (CT) and Collection of DAGs (CD).

The steps of the methods in accordance with the arrangements are preferably implemented as software code for execution on a computer system.

DESCRIPTION OF DRAWINGS

A number of preferred embodiments of the present invention will now be described with reference to the drawings, in which.

DETAILED DESCRIPTION

A brief review of terminology and notation used herein is first undertaken, then there is provided a detailed description of the methods of selecting keywords representative of a document using an ontology in accordance with first, second and third arrangements, a detailed description of computer software for implementing the steps of the methods, and a detailed description of computer hardware that is suitable for executing such computer software.

Terminology

Ontology

In this document, the term "ontology" and "taxonomy" are used synonymously. An Ontology can have many possible structures; the most common among which are directed acyclic graphs (DAGs) and a collection of trees (CT). The methods described in this document work with both of them and a third structure, collection of DAGs (CD). A common feature of these Ontology structures is that they each comprise one or more root vertices, a plurality of descendent vertices, and a plurality of descendent leaves, where the descendent vertices and leaves correspond to respective terms, that is words, in the ontology. An ontology that has a DAG structure may have a vertex that has multiple parents, which is a source of ambiguity. An ontology that has a CT structure comprises a number of vertices, where each vertex has only one parent. A vertex may appear in multiple trees. In this CT structure, transitivity does not hold across trees. An ontology that has a CD structure comprises multiple DAGs. In this CD structure a vertex may have multiple parents and may appear in multiple DAGs. Also transitivity does not hold across the DAGs.

Ambiguity

A term is ambiguous when there are several paths in the ontology leading to it. Ambiguity arises in a DAG ontology structure when there are several paths to a single vertex. Ambiguity arises in CT/CD ontology structures where there are multiple vertices denoting the same term.

Context

A context is defined as a unique path in the ontology from the root to the term.

Notation

Pt denotes the set of all paths from the root to a term t in the entire ontology.

$w_t$ denotes the frequency of occurrence of term t in the document.

f is a propagation factor in [0,1] and is independent of the weight $w_v$. Namely, the propagation factor f can take a value between 0 and 1 inclusive. The propagation factor f determines what fraction of the weight $w_v$ contributes to the parent in the tree. Preferably, f is a constant, however, in alternative embodiment(s), f can be tunable, namely a function of, the level in the tree, the number of children, a weight on the edge, or just any arbitrary number. Furthermore, these edge-weights may be used to incorporate an experts domain knowledge. For example, in the MeSH ontology, "Cyclin A" is a child of "cyclin" which is a child of "growth substances". As the former parent-child relationship is "stronger" than the latter, this can be captured by assigning weight to the edges, which can be used in defining the propagation factor f.

Methods

Figure 1:
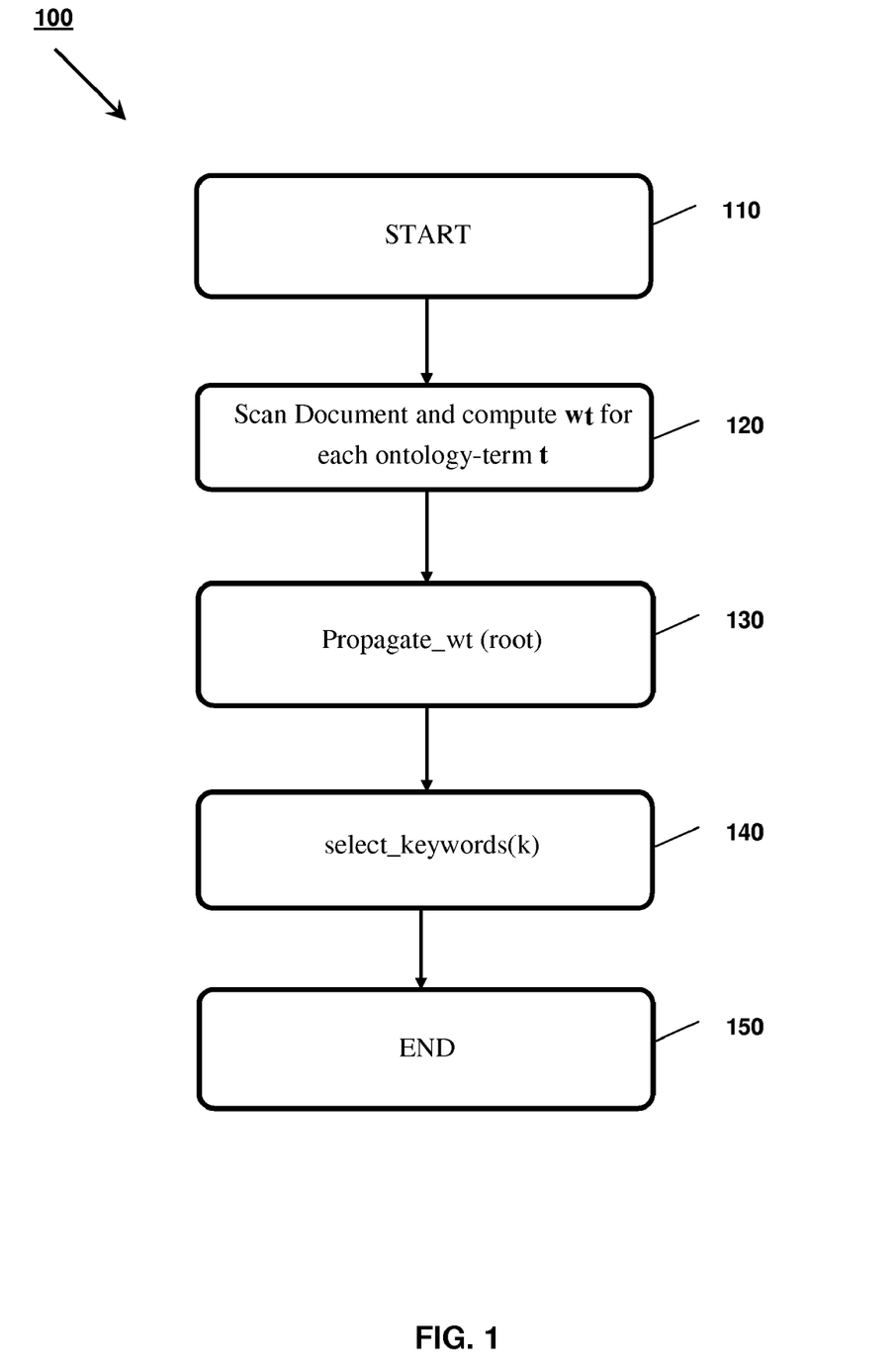
FIG. 1 illustrates a flow chart of a method of selecting keywords representative of a document using an ontology in accordance with a first arrangement.

Turning now to FIG. 1, there is shown a flow chart of a method 100 of selecting keywords representative of a document using an ontology in accordance with a first arrangement. For ease of explanation, the method 100 is described with reference to a single ontology structure comprising a Directed Acyclic Graph (DAG), however the method 100 is not intended to be limited to a single ontology structure or a ontology structure comprising a DAG. The method 100 can also be used on a plurality of ontologies and also on other ontology structures such as collection of trees (CT) and a collection of DAGs (CD). Furthermore, the method 100 can also be used on a part of document. Generally speaking, the method 100 computes the frequency of occurrences of all the terms of the ontology that occur in the document and assigns these frequency of occurrence values to corresponding vertices in the ontology structure. The method 100 then propagates these frequency of occurrence values from the leaves upwards to the root of the ontology structure, during which it weights them with a propagation factor. The method 100 then outputs the words of the ontology structure having the k largest weighted values as the keywords representative of the document. In this way, the present method 100 consistently selects k keywords from the ontology structure that are generally the most representative of the document. It will also be apparent that the keywords are selected from the ontology structure and not from the document itself thus enabling the selection of representative keywords that do not necessarily appear in the document.

The method 100 commences at step 110 where the document and ontology are retrieved and any necessary parameters are initialised. The method 100 then proceeds to step 120, where the method 100 scans the document and computes the frequency of occurrence $w_t$ of each term t of the ontology in the document.

After completion of step 120, the method 100 then proceeds to step 130, where the method 100 calls a sub-process 400 'propagate_wt(vertex v)' and passes the root vertex of the DAG of the ontology structure as the vertex v to this sub-process 400.

The sub-process 'propagate_wt(root)' 400 recomputes and stores for each leaf and vertex v of the DAG an updated frequency occurrence value $w_v$. This updated frequency occurrence value $w_v$ in the case of a vertex v equals the sum of the old frequency occurrence value $w_v$ associated with that vertex v and the updated frequency occurrence values of its immediate descendants times the propagation factor(s) $f_c$ for those descendents. The frequency occurrence value for a leaf v remains unchanged. This sub-process 400 will be described below in more detail with reference to FIG. 4.

After completion of the sub-process 400, the method 100 proceeds to step 140, where the method 100 calls a sub-process select_keywords(k) 140. This sub-process 140 takes as input an integer value k and then traverses the DAG ontology structure and selects and returns those words with the k largest updated values $w_t$ as the keywords representative of the document. Specifically, the sub-process 140 scans the entire DAG ontology structure and generates a list of k terms having the largest updated values in the DAG ontology structure, and then returns that list. After completion of the sub-process 140, the method 100 then terminates 150. In this arrangement, the method utilises purely fractional weight-propagation, i.e., the notion that a fraction of the weight may be transferred from a vertex to its parent, progressively, with the intention that the vertex which has a lot of weighted descendants gets chosen as the keywords. To ensure that the effect of a vertex does not show up "unabatedly" in a high ancestor, at each level, the weight is multiplied by a fraction.

Figure 2:
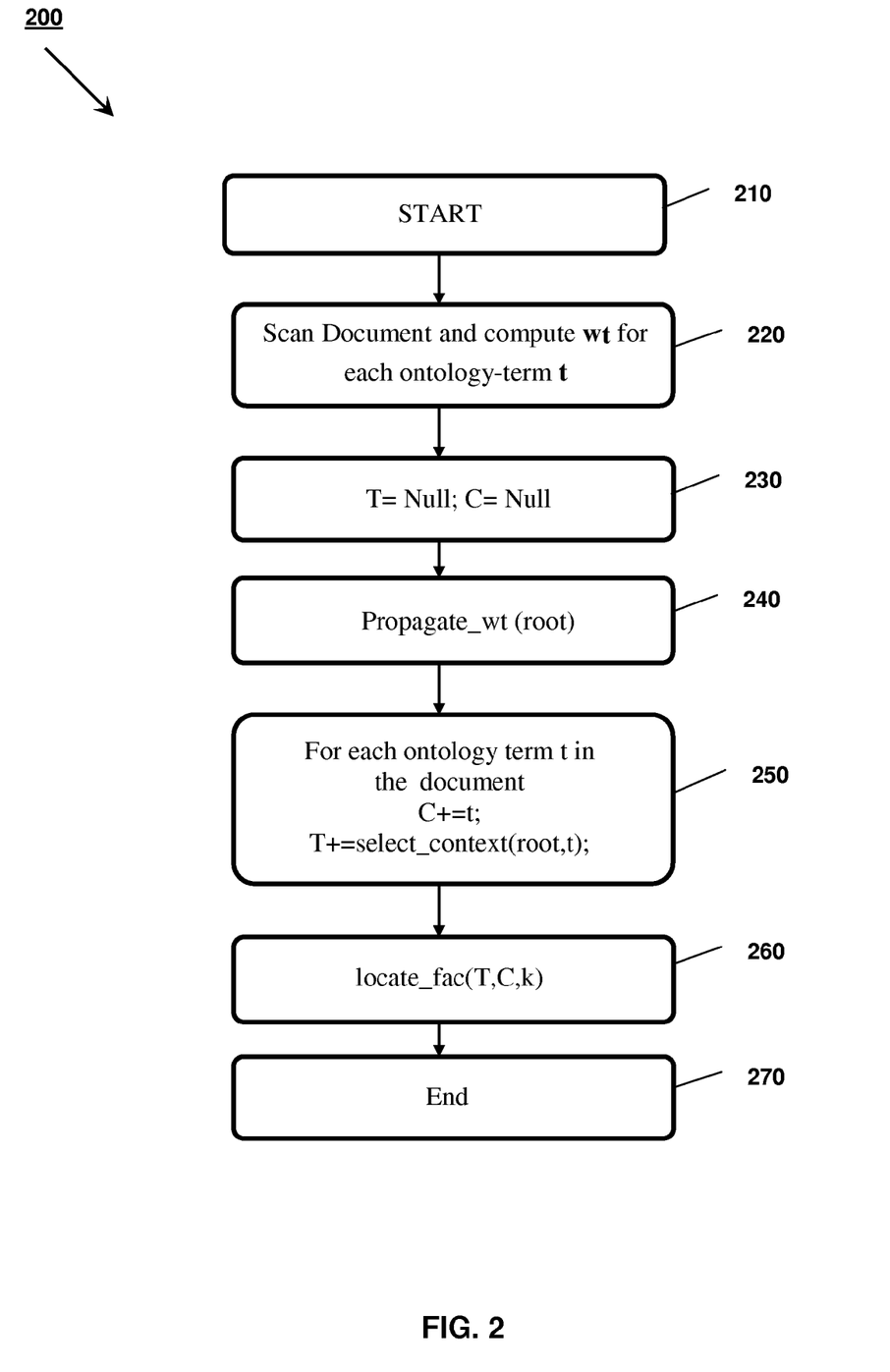
FIG. 2 illustrates a flow chart of a method of selecting keywords representative of a document using an ontology in accordance with a second arrangement.

Turning now to FIG. 2, there is shown a flow chart of a method 200 of selecting keywords in a document using an ontology in accordance with a second arrangement. For ease of explanation, the method 200 is described with reference to a single ontology structure comprising a Directed Acyclic Graph (DAG), however the method 200 is not intended to be limited to a single ontology structure or a ontology structure comprising a DAG. The method 200 can also be used on a plurality of ontologies and also on other ontology structures such as collection of trees (CT) and a collection of DAGs (CD). Furthermore, the method 200 can also be used on a part of document. Generally speaking, the method 200 computes the frequency of occurrences of all the terms of the ontology that occur in the document and assigns these frequency of occurrence values to corresponding vertices in the ontology structure. The second arrangement then propagates these frequency of occurrence values from the leaves upwards to the root of the ontology structure, during which it weights them with a propagation factor. The second arrangement then selects a sub-structure of the ontology structure, which sub-structure comprises a set of unique paths from the root to the terms t having non-zero weights. This selection step disambiguates the context of these terms t. Finally, the second arrangement performs a greedy facility location sub-process, wherein all vertices having non-zero weights are considered as clients that have to be served by opening k facilities at k vertices such that a sum of weighted distances of all the clients to their associated facilities is minimized.

In this way, the present method 200 consistently selects k facilities, that is k keywords, from the ontology structure that are generally the most representative of the document. It will also be apparent that the keywords are selected from the ontology structure and not from the document itself thus enabling the selection of representative keywords that do not necessarily appear in the document.

The method 200 commences at step 210 where the document and ontology are retrieved and any necessary parameters are initialized. The method 200 then proceeds to step 220, where the method 200 scans the document and computes the frequency of occurrence $w_t$ of each term t of the ontology in the document. The method 200 then proceeds to step 230 where a variable T for storing the indices of the vertices of a sub-tree of the DAG ontology structure is initialized and set to Null. Also, during step 230 a variable C, for storing a sub-list of the vertices of the DAG is initialized and set to Null.

Figure 4:
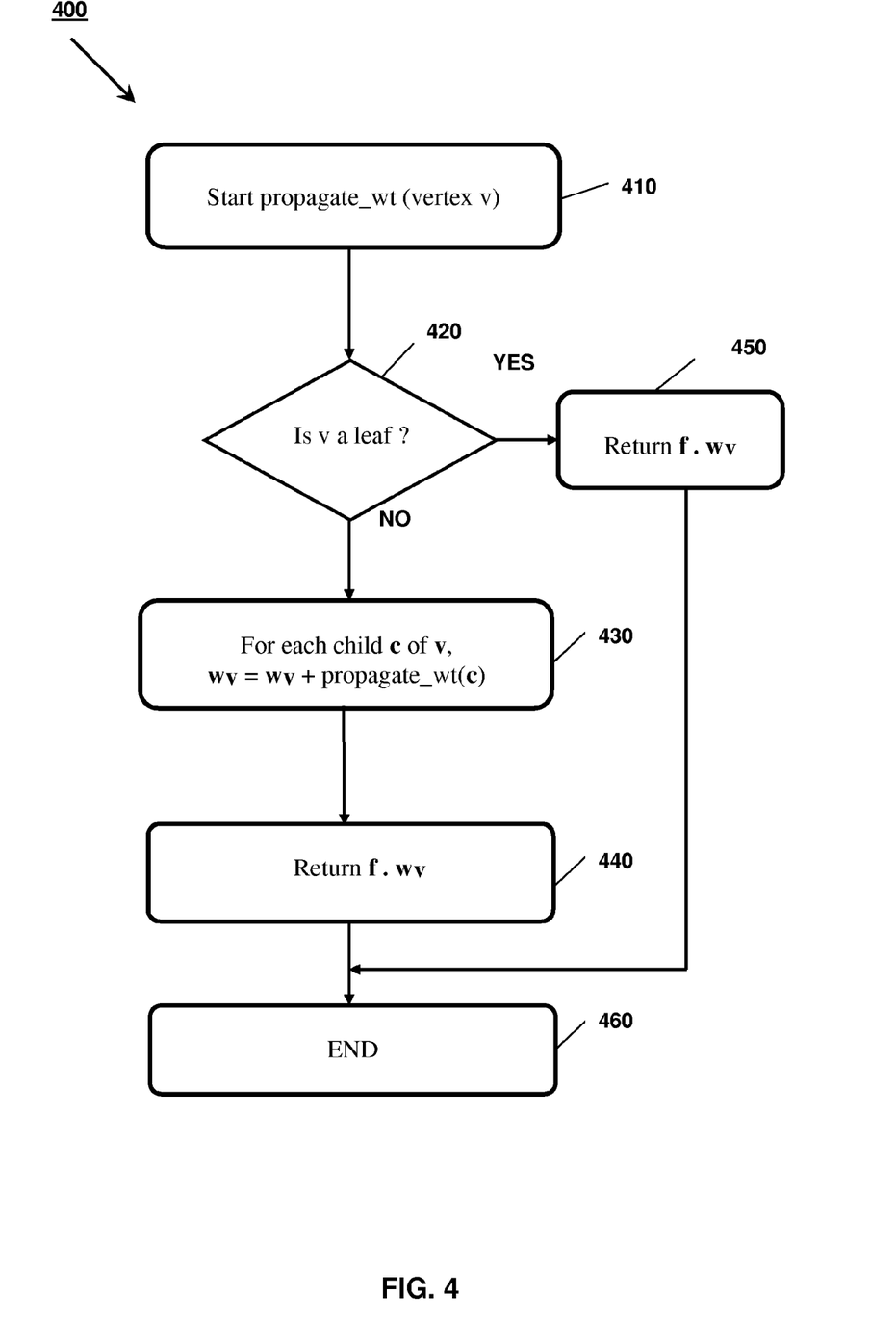
FIG. 4 illustrates a flow chart of the sub-process 'propagate_wt(vertex v)' of step 130 of the method 100 of FIG. 1, and step 240 of the method 200 of FIG. 2.

After these two variables T and C have been set to Null, the method 200 then proceeds to step 240, where the method 200 calls the sub-process 400 'propagate_wt(vertex v)', and passes the root vertex of the DAG of the ontology structure as the vertex v to this sub-process 400.

As mentioned above, the sub-process 'propagate_wt (root)' 400 recomputes and stores for each leaf and vertex v of the DAG an updated frequency occurrence value $w_v$. This updated frequency occurrence value $w_v$ in the case of a vertex v equals the sum of the old frequency occurrence value $w_v$ associated with that vertex v and the updated frequency occurrence values of its immediate descendants times the propagation factor(s) $f_c$ for those descendents. The frequency occurrence value for a leaf v remains unchanged. This sub-process 400 will be described below in more detail with reference to FIG. 4.

After completion of step 240, the method 200 then proceeds to step 250. This step 250 is a loop and performs a first sub-step C=C+t, and then performs a second sub-step T=T+select_context(root,t) for each ontology term t that occurs in the document. It should be noted that these sub-steps are not performed on ontology terms t that do not occur in the document. Specifically, the loop traverses the DAG structure and performs these sub-steps only on those terms t associated with vertices t that have non-zero weights $f.w_v$. During a pass of the loop for a current vertex t that has a non-zero weight $f.w_v$, the first sub-step C=C+t, appends the current vertex t to the list C. Thus after completion of the loop the variable C contains a list of all those vertices of the DAG that have non-zero weights $f.w_v$. Also, the operation T=T+select_context(root,t) appends to a sub-tree T the unique path from the root to the term t associated with the current vertex t. Thus after the completion of the loop, the variable T contains a sub-tree T of the DAG ontology, which sub-tree T comprises a list of the unique paths from the root to the terms t that have non-zero weights. In this fashion, the T=T+select_context (root,t) is used to disambiguate the context of the terms t so that unique paths from the root to the respective terms are selected from the set of all paths $P_t$. The operation T=T+select_context(root,t) achieves this by calling a sub-process 'context_context(root,t)' 500 for each current vertex t that has a non-zero weight, which sub-process 500 returns a list of vertices defining the unique path from the root to that term. This sub-process 'select_context(root,t)' 500 is described in more detail with reference to FIG. 5. In principle other disambiguation sub-processes may be used as alternatives.

After completion of step 250, the method 200 then proceeds to step 260 where a sub-process 'locate_fac(T, C, k)' 600 is performed. This sub-process 'locate_fac(T, C, k)' 600 is a fractional greedy optimal facility location sub-process and takes as input the variable T, the variable C, and an integral variable k that indicates the number of keywords to be selected. This sub-process then returns k key words that are representative of the document. This sub-process 600 will be described below in more detail with reference to FIG. 6. After completion of the sub-process 260, the method 200 then terminates 270.

Figure 3:
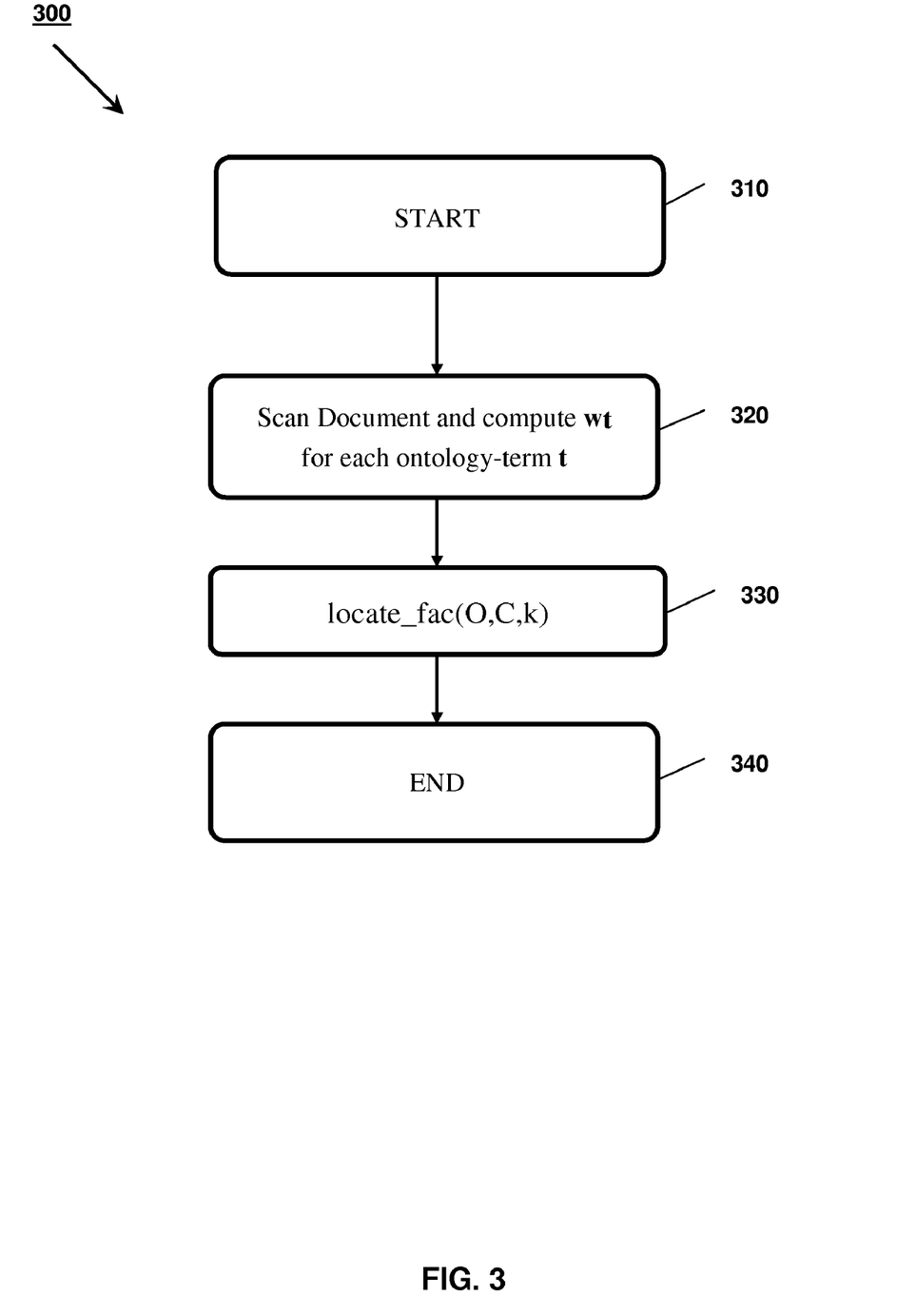
FIG. 3 illustrates a flow chart of a method of selecting keywords representative of a document using an ontology in accordance with a third arrangement.

Turning now to FIG. 3, there is shown a flow chart of a method 300 of selecting keywords representative of a document using an ontology in accordance with a third arrangement. For ease of explanation, the method 300 is again described with reference to a single ontology structure comprising a Directed Acyclic Graph (DAG), however the method 300 is not intended to be limited to a single ontology structure or a ontology structure comprising a DAG. The method 300 can also be used on a plurality of ontologies and also on other ontology structures such as collection of trees (CT) and a collection of DAGs (CD). Furthermore, the method 300 can also be used on a part of a document. Generally speaking, the method 300 computes the frequency of occurrences of all the terms of the ontology that occur in the document and assigns these frequency of occurrence values to corresponding vertices in the ontology structure. The third arrangement then performs a greedy facility location sub-process, wherein all vertices having non-zero frequency of occurrence values are considered as clients that have to be served by opening k facilities such that a sum of weighted distances of all the clients to their associated facilities is minimized. In this way, the present method 300 consistently selects k keywords from the ontology structure that are generally the most representative of the document. It will also be apparent that the keywords are selected from the ontology structure and not from the document itself thus enabling the selection of representative keywords that do not necessarily appear in the document.

The method 300 commences at step 310 where the document and ontology are retrieved and any necessary parameters are initialized. The method 300 then proceeds to step 320, where the method 300 scans the document and computes and stores the frequency of occurrence wt of each term t of the ontology in the document After completion of step 320, the method 300 then proceeds to step 330 where the sub-process 'locate_fac O, C, k)' 600 is performed. This sub-process 'locate_fac(O, C, k)' 600 is the same fractional greedy optimal facility location sub-process that is used in the second arrangement but in this third arrangement takes as input the ontology structure O, a variable C and a integral variable k. The variable C is a list of all vertices v that have non-zero weights and the variable k is an integer which indicates the number of keywords to be selected. This sub-process 600 then returns k key words that are representative of the document. The sub-process 'locate_fac(O, C, k)' 600 is described below in more detail with reference to FIG. 6. After completion of step 330, the method 300 then terminates 340.

Turning now to FIG. 4, there is shown a flow chart of the sub-process 'propagate_wt vertex v)' as used in steps 130, and 240 of the methods of FIGS. 1 and 2 respectively. The sub-process 400 'propagate_wt (vertex v)' is a recursive sub-process and commences at steps 130 and 240 where the root vertex is initially passed to the sub-process 400 as the current vertex v. The sub-process 400 then proceeds to a decision block 420, where a check is made whether the current vertex v is a leaf. If the decision block 420 determines that the current vertex v is a leaf then the sub-process 400 proceeds to step 450 where the sub-process 400 returns the value $f.w_v$, which value is equal to the propagation factor f for the current leaf times the frequency of occurrence value $w_v$ for the current leaf v. As mentioned above the propagation factor f is a value independent of the weight $w_v$, and can be a predetermined constant, or may be variable whose value is decided based upon the consideration of many factors. If on the other hand, the decision block 420 determines the current vertex v is not a leaf, then the sub-process 400 proceeds to step 430.

The sub-process 400 during step 430 computes the updated frequency of occurrence value $w_v$ for the current vertex v. As mentioned above, this updated frequency occurrence value $w_v$ in the case of a vertex v equals the sum of the old frequency occurrence value $w_v$ associated with that vertex v and the updated frequency occurrence values of its immediate descendants times the propagation factor(s) $f_c$ associated with those descendents. Namely, the updated frequency occurrence value $w_v$ for a vertex v equals $$w_v = w_v + \sum_c f_c \cdot w_c,$$

where $w_c$ are the previously updated frequency occurrences values for the child vertices of the vertex v. The step 430 achieves this by determining, for each child vertex c of the current vertex v, the sum $w_v = w_v + \text{propagate\_wt}(c)$, where the sum recursively calls the sub-process propagate_wt(c) for each child vertex c of the current vertex v. After the completion of step 430, the sub-process 400 proceeds to step 440, where the sub-process 400 returns the current value of the frequency occurrence value f.wv. After the completion of either of the steps 450 or step 440, the sub-process 400 then terminates 460, and then the respective methods of FIGS. 1 and 2 then proceeds to step 140 and 250. In this fashion, the sub-process 400 computes the updated frequency of occurrence values $w_v$, whereby these values $w_v$ increase in value along all paths from the leafs to the root of the ontology. In this way, a fraction of the frequency of occurrence values are propagated up the tree from the leaves to the root.

Figure 5:
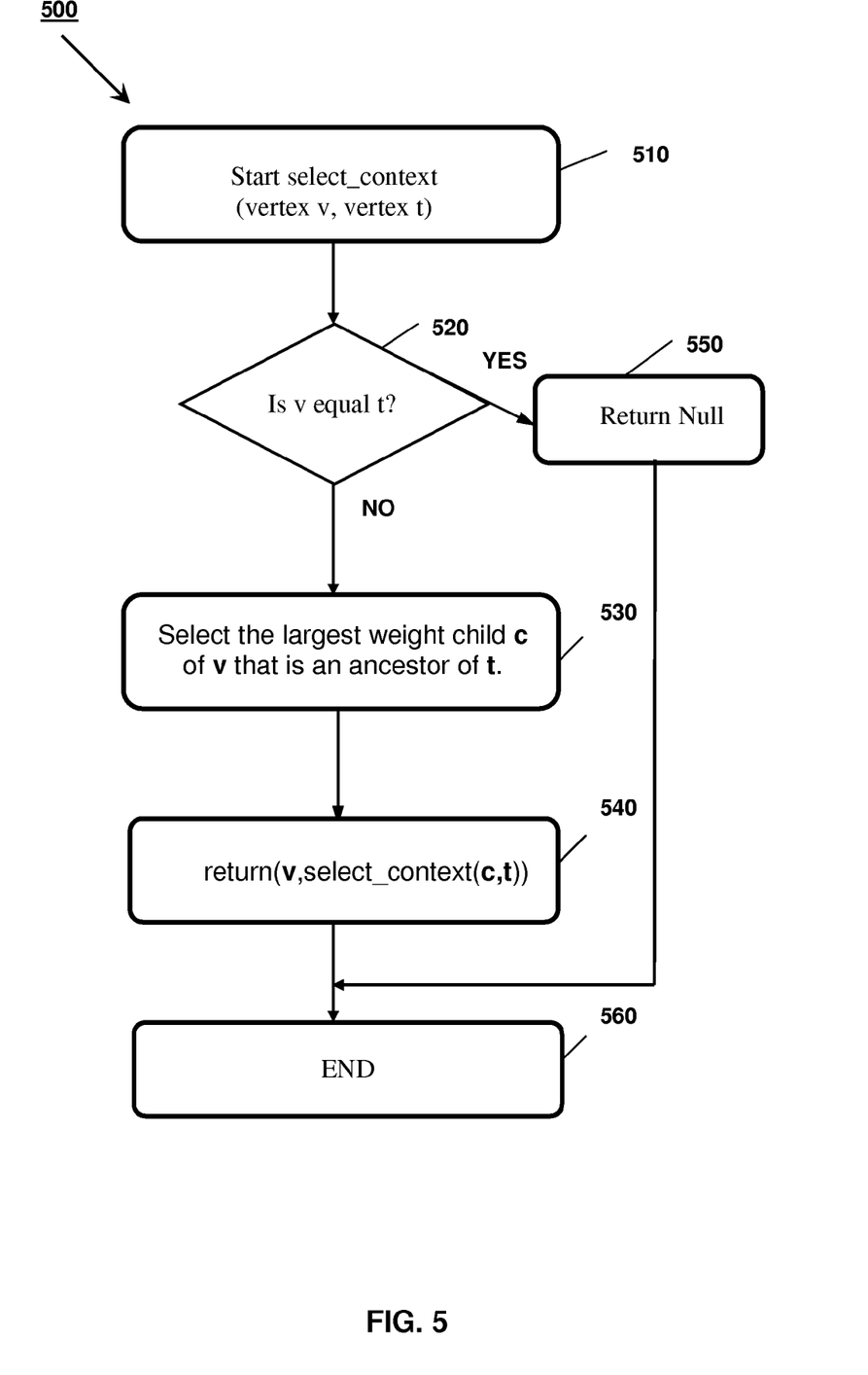
FIG. 5 illustrates a flow chart of the sub-process 'select_context(vertex v, vertex t)' used in step 250 of the method of FIG. 2.

Turning now to FIG. 5, there is shown a flow chart of the sub-process select_context(vertex v, vertex t) of step 250 of the method of FIG. 2. As mentioned previously, the sub-process 500 select_context(vertex v, vertex t) is called for each term t in the ontology that occurs in the document, that is called for each term that has a non-zero weighted vertex t. The sub-process 500 select_context vertex v, vertex t) is a recursive sub-process and commences at step 510 where the root vertex is initially passed to the sub-process 500 as the current vertex v and the current vertex t is passed to the sub-process 500 as vertex t. The sub-process 500 then proceeds to a decision block 520, where a check is made whether the current vertex v is the same as the current vertex t. If the decision block 520 determines that the current vertices v and t are identical, then the sub-process 500 proceeds to step 550, where the sub-process 500 returns a Null value and the sub-process 500 terminates 560. On the other hand, if the decision block 520 determines that the current vertices v and t are not identical, then the sub-process 500 proceeds to step 530.

The sub-process 500 during step 530 selects the immediately descendant (ie. child) vertex c of the current vertex v that is an ancestor of the current vertex t and that has the largest weight $f.w_v$. After the completion of step 530, the sub-process 500 proceeds to step 540, where the sub-process 500 performs a return operation return(v, select_context(c, t)). The second parameter of this return operation recursively calls the sub-process 500 'select_context(c, t)' with the current vertex v set to the selected child vertex c. After the completion of the step 540, the sub-process 500 then terminates 560, and returns to the method 200 that called the sub-process 500. In this fashion, the sub-process 500 selects the most appropriate context for each of the ontology terms t occurring in the document. Specifically the sub-process 500 for a term t returns a unique path in the form of a series of vertices commencing at the root vertex and finishing at the vertex t followed the Null value. The sub-process 500 selects the unique path to the term t in the ontology in such a manner that where there are several paths branching from a single ancestor vertex of the unique path to a single descendant vertex, the sub-process 500 selects that immediately descendant vertex of the single ancestor vertex that has the largest weight as the next member of the unique path. In this way, the combination of the sub-processes 400 and 500 consistently select a unique path for each term, and thus are able to disambiguate terms in the document.

Figure 6:
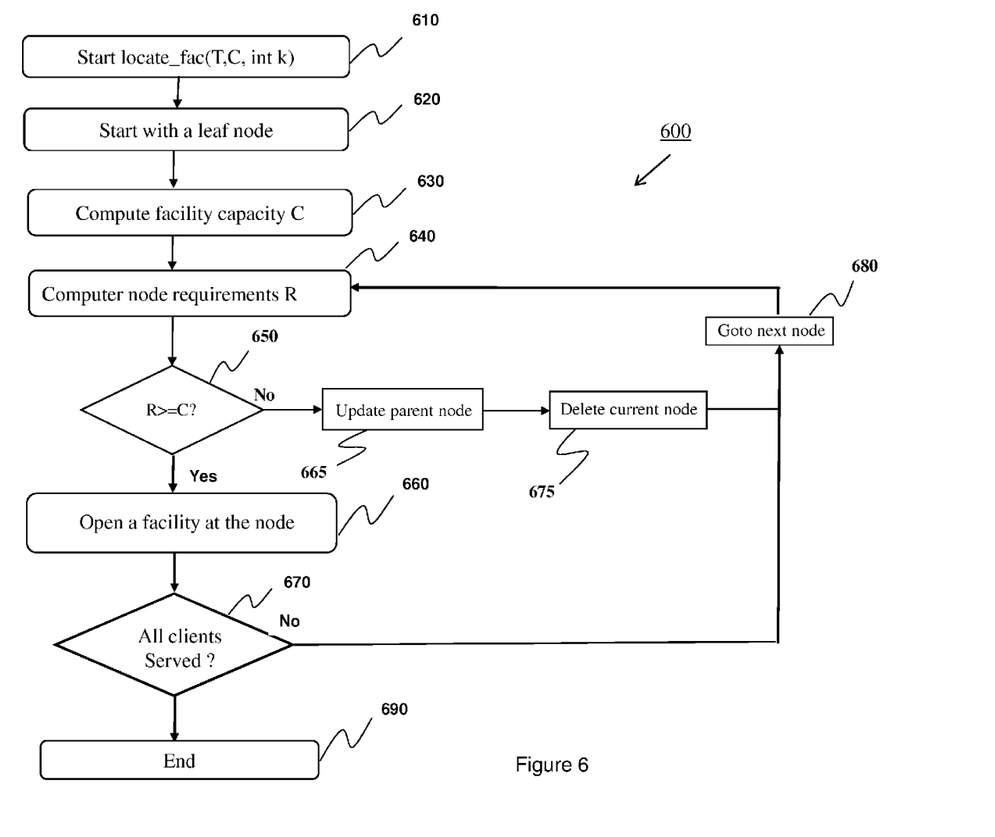
FIG. 6 illustrates a flow chart of the sub-process 'locate_fac (T, C, integer k)' used in step 260 of the method of FIG. 2, and step 330 of FIG. 3.

Turning now to FIG. 6, there is shown a flow chart of the sub-process locate_fac(T, C, integer k) 600 used in step 260 of the method of FIG. 2, and also in step 330 of FIG. 3. Specifically, this fractional greedy facility location sub-process 600 selects k facilities that minimizes a cost, which cost equals the total of the servicing costs for all the clients. The sub-process 600 in computing this cost opens k facilities at k vertices of the tree T, which k facilities serve clients C the latter being the non-zero vertices of the tree T. The servicing cost of a client is computed as the distance of that client to its associated facility multiplied by a weight associated with the client. This associated weight equals the number of occurrences that the word associated with the client (viz vertex) appears in the document, and the distance between a client and a facility is the number of edges between that client and that facility. It is important to recognise that this weight is the initial weight (which is based on the number of occurrences in the document) and not the updated weights generated by the propagate_wt process 400. Also, this servicing cost is subject to the constraints that a facility can only serve descendant clients and a client can be served by multiple facilities. Accordingly, in the case of a client being served by multiple facilities, the servicing cost of this client is the total of the servicing costs for this client to the respective multiple facilities. The cost of an unserved client is set infinitely high, ie. very high compared to the other costs, so that no solution with unsatisfied clients can be the optimal solution. In this case, the number k of facilities to be opened is adjusted so as to obtain an optimal, viz minimal, solution.

The greedy facility location sub-process locate(T, C, integer k) 600 generates an optimal solution of the following:

$$\min \sum_{u \in V} W_v \cdot d(v, F_v) \quad \text{Eqn (1)}$$

$$\text{i. } d(v, F_v) = \sum_{F_i \text{ serves } v} d(v, F_i)$$

where $d(v, F_v)$ denotes the distance between a vertex v and its associated set of facilities $F_v$, summed over the distance between a vertex v and each one of its facilities $F_i$, where the distance $d(v, F_i)$ is the number of edges between the vertex v and the facility $F_i$, and where $W_v$ is the number of occurrences that the word associated with the vertex v appears in the document. A vertex v may be served entirely by a single facility $F_i$, or may be partially served by all the facilities $F_i$, $1 <= i <= k$.

The greedy facility location sub-process locate_fac(T, C, integer k) 600 commences at step 610, where the variables T, C and k are passed to the sub-process 600 and other necessary parameters are initialised. As mentioned previously, the method in accordance with the third arrangement passes the entire DAG ontology tree structure O to the sub-process 600 via means of this variable T, viz locate_fac(O, C, integer k). On the other hand, the method in accordance with the second arrangement passes a sub-tree T of the DAG ontology structure O to the sub-process 600 via this variable T, viz locate_fac(T, C, integer k). In the later arrangement, this sub-tree T comprises a list of the unique paths from the root to the terms t that have non-zero weights. For the ease of explanation of the sub-process 600, the ontology tree structure O and the sub-tree structure T passed to the sub-process 600 will both be referred to as tree T. The variable C comprises a list of all clients, namely all vertices v of the tree T that have non-zero weights, and the integer k represents the number of keywords to be selected.

After step 610, the sub-process 600 then computes 620 the facility capacity C. This facility capacity C equals the sum of all the weights $w_v$ of the tree T divided by the maximum number of facilities k. As mentioned previously, these weights $w_v$ are associated with respective vertices of the tree, and each weight equals the number of occurrences that a word associated with the vertex appears in the document. This weight is the initial weight (which is based on the number of occurrences in the document) and not the updated weights generated by the propagate_wt process 400. After computation of the facility capacity C, the sub-process 600 then deletes all leaves of the tree T that have weights $w_v$ equal to zero.

After step 630, the sub-process 600 enters a loop 640-680, where the sub-process 600 first selects any leaf v of the tree T not already processed by the loop for processing. The sub-process 600 then proceeds to a decision block 650, where the sub-process 600 checks whether the weight $w_v$ associated with the selected leaf v is greater than or equal to the facility capacity C.

If the decision block 650 determines that $w_v >= C$ for the selected leaf v, then the sub-process opens 660 a facility at the selected leaf v. The sub-process 600 then propagates 670 the weight $[w_v - C]$ to the parent node of the selected leaf v. Specifically, the weight of the parent of the selected leaf v is updated according to $w_{parent(v)} = w_{parent(v)} + [w_v - C]$. After completion of the propagation step 670, the sub-process 600 proceeds to decision block 680.

If on the other hand, the decision block 650 determines that $w_v < C$ for the selected leaf v, then the sub-process 600 propagates 665 the weight $w_v$ of the selected leaf to its parent node. Specifically, the weight of the parent of the selected leaf is updated according to $w_{parent(v)} = w_{parent(v)} + w_v$. After this updating step 665, the sub-process 600 then deletes 675 the selected leaf v from the tree T. After completion of the deletion step 675, the sub-process 600 proceeds to decision block 680.

The decision block 680 checks whether or not k facilities have been opened. In the event the decision block 680 returns false, the sub-process 600 returns to step 640 for processing of a leaf not previously processed. It should be noted that in the case where $w_v < C$ for a selected leaf, the sub-process 600 deletes the selected leaf from the tree T. The sub-process 600 in this case results in a new set of leaves (a shunken tree T') to be subsequently processed by the loop 640-680. In the case where $w_v >= C$, the sub-process 600 does not delete the selected leaf and in the next pass of step 640, the sub-process 600 selects from the tree (T or T' as the case may be) a leaf that has not been previously processed.

The sub-process 600 continues in this fashion until the decision block 680 finally determines that k facilities have been opened, and the sub-process 600 terminates.

In this way, the modeling of the key selection as a capacitated facility location problem results in a reliable and robust selection of keywords and the greedy facility location sub-process 600 is an efficient process for solving that problem. In addition, the greedy facility location sub-process 600 guarantees optimally where a tree T structure is extracted from an ontology O using disambiguation as in the second arrangement. However, in the third arrangement where the ontology O is left as is, the sub-process 600 does not guarantee optimality. But, the third arrangement whilst not giving optimal results it is expected to produce useful results.

Other facility location sub-processes for solving the aforementioned facility location problem (Eqn (1)) may be used in the second, and third arrangements instead of the fractional greedy optimal location sub-process described herein with reference to FIG. 6. In particular, an optimal dynamic programming based sub-process or an optimal fractional greedy sub-process can be used for ontology structures comprising trees (CT). In further variations, a greedy static sub-process or a greedy adaptive sub-process can be used for ontology structures comprising a DAG. Furthermore, capacitated and uncapacitated versions can be used.

As can be seen, the methods in accordance with the first, second and third arrangements are not limited to any specific ontology, and different ontologies may be plugged in depending on the nature and level of the keyword representation that is required. In this sense these methods are independent of domain ontology (taxonomy).

In a variation of the first and second arrangements the propagation factor can be tunable. For example, the propagation factor f can be made a function of the edge weight, level depending on the actual ontology used.

The methods in accordance with the first and third arrangements can work with any of the ontology structures DAG, CD and CT. The method in accordance with the second arrangement, in addition to working with DAG ontology structures, can also work with CT ontologies subject to some modifications to selecting the context, that is the context selection sub-process 300. In the case of CT structures, a number of alternative ways of selecting the context are possible. In all of these alternatives, the modified context selection sub-process first finds all the paths leading from the root to the term. In one alternative the modified context selection sub-process then selects the path that has the maximum average weight per vertex. In another alternative the modified context selection sub-process then selects the path that has the vertex with the largest weight. In still another alternative the modified context selection sub-process selects the path with the largest sum of weights. The method in accordance with the second arrangement can also be used with CD ontologies subject to some modifications to the context selection sub-process 300. The modified method for CD ontologies can be implemented by performing the context selection sub-process 300 independently on each of the DAGs, which results in a collection of trees, and then implementing one of aforementioned modified context selection sub-processes on these collection of trees.

Computer Software

The steps of the methods 100, 200, and 300 are preferably implemented as software code means for execution on a computer system such as that described with reference to FIG. 7. Exemplary pseudo software code for implementing the steps of the method 100 is illustrated as follows:

```
scan the document and compute wt for each ontology-term t;
propagate_wt(root) ;
select_keywords(k);
Sub-Routines:
propagate_wt(v)
    if (v is a leaf) return f . w_v
    else
        for each child c of v,
            w_v = w_v + propagate_wt(c) ;
    return f . w_v
select_keywords(k)
    return the top k words with maximum weight f.w_v
```

Exemplary pseudo software code for implementing the steps of the method 200 is illustrated as follows:

```
scan the document and compute wt for each ontology-term t;
T = Null; C = Null;
propagate_wt(root);
for each ontology-term t in the document
    C += t;
    T += select_context(root,t);
    //used to disambiguate the context of t so that a unique path is
    //selected from root to t. In principle, other disambiguation sub-
    //processes may used as alternatives
locate_fac(T,C,k):
    //runs a fractional greedy optimal facility location sub-process on //a
    tree T for clients in C to place k facilities.
```

-continued

```
Sub-Routines:
propagate_wt(v)
    if (v is a leaf) return f . w_v
    else
        for each child c of v,
            w_v = w_v + propagate_wt(c) ;
    return f . w_v
select_context(v,t)
    if(v == t), return null ;
    else
        select the largest weight child c of v that is an ancestor of t.
        // Note that in the case of a DAG, t is a unique vertex,
        // whereas in the case of CT/CD, t may appear as a
        // collection of vertices.
    return (v,select_context(c,t)) ;
```

Exemplary pseudo software code for implementing the steps of the method 300 is illustrated as follows:

```
scan the document and compute wt for each ontology-term t;
locate_fac(T,C,k):
    //runs a fractional greedy optimal facility location sub-process on
    //a tree T for clients in C to place n facilities.
```

The aforementioned pseudo code is not intended to be limited to any particular programming language and implementation thereof. It will be appreciated that a variety of programming languages and implementations thereof may be used to implement the teachings of the invention as described herein.

Computer Hardware

Figure 7:
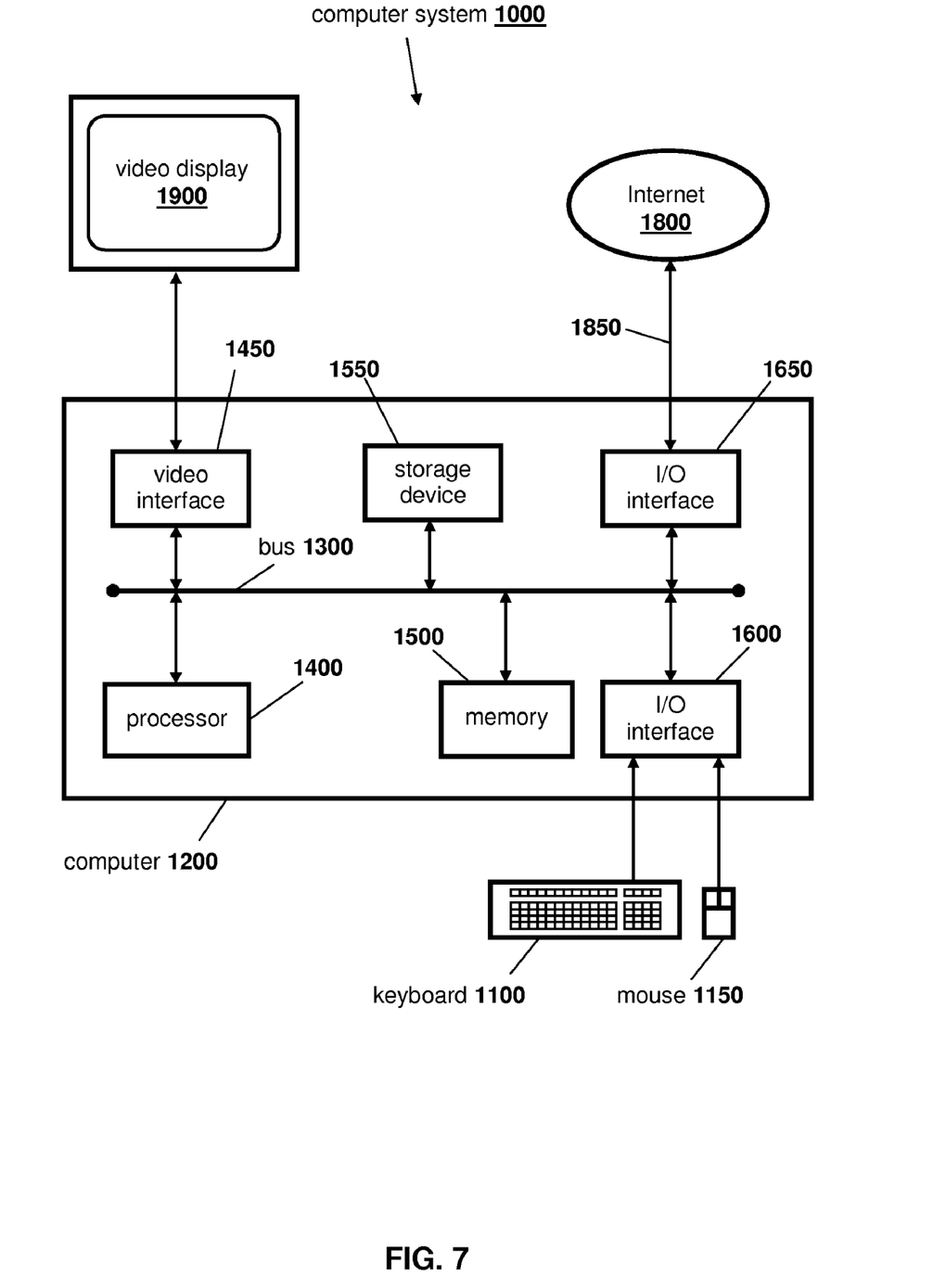
FIG. 7 is a schematic representation of a computer system suitable for performing the techniques described herein.

FIG. 7 is a schematic representation of a computer system 1000 of a type that is suitable for executing computer software for selecting keywords representative of a document using an ontology. Computer software executes under a suitable operating system installed on the computer system 1000, and may be thought of as comprising various software code means for achieving particular steps of the methods 100, 200 or 300.

The components of the computer system 1000 include a computer 1200, a keyboard 1100 and mouse 1150, and a video display 1900. The computer 1200 includes a processor 1400, a memory 1500, input/output (I/O) interfaces 1600, 1650, a video interface 1450, and a storage device 1550.

The processor 1400 is a central processing unit (CPU) that executes the operating system and the computer software executing under the operating system. The memory 1050 includes random access memory (RAM) and read-only memory (ROM), and is used under direction of the processor 1400.

The video interface 1450 is connected to video display 1900 and provides video signals for display on the video display 1900. User input to operate the computer 1200 is provided from the keyboard 1100 and mouse 1150. The storage device 1550 can include a disk drive or any other suitable storage medium.

Each of the components of the computer 1200 is connected to an internal bus 1300 that includes data, address, and control buses, to allow components of the computer 1200 to communicate with each other via the bus 1300.

The computer system 1000 can be connected to one or more other similar computers via a input/output (I/O) interface 1650 using a communication channel 1850 to a network, represented as the Internet 1800.

The computer software may be recorded on a portable storage medium, in which case, the computer software program is accessed by the computer system 1000 from the storage device 1550. Alternatively, the computer software can be accessed directly from the Internet 1800 by the computer 1200. In either case, a user can interact with the computer system 1000 using the keyboard 1100 and mouse 1150 to operate the programmed computer software executing on the computer 1200.

Other configurations or types of computer systems can be equally well used to execute computer software that assists in implementing the techniques described herein.

CONCLUSION

Various alterations and modifications can be made to the techniques and arrangements described herein, as would be apparent to one skilled in the relevant art.

The invention claimed is:

1. A non-natural language processing (NLP) computer-implemented method of performing purely an ontology-based search of an electronic document by selecting keywords representative of said electronic document from an ontology, said non-NLP computer-implemented method comprising:

retrieving, by a computer, said electronic document;

retrieving, by said computer, said ontology associated with said electronic document, said ontology comprising one of a directed acyclic graph (DAG), a collection of trees, and a collection of DAGs, wherein said ontology comprises one or more root vertices, a plurality of descendent vertices, and a plurality of descendent leaves, said descendent vertices and said descendent leaves corresponding to terms in said ontology;

scanning, by said computer, said electronic document and computing, for each term in said ontology, a first value representative of a frequency of occurrence of said each term in said electronic document;

assigning, by said computer, said first value for said each term to corresponding vertices in said ontology;

propagating, by said computer, said first value from leaf vertices of said ontology upwards to said one or more root vertices of said ontology by assigning to each of said descendent vertices a second value, wherein said second value equals a sum of said first value of said each of said descendent vertices plus second values of immediate descendents of said each of said descendent vertices multiplied by a propagation factor, wherein said propagation factor comprises a fractional weight-propagation;

inputting, to said computer, an integer value, k; and traversing, by said computer, all said descendent leaves and all said descendent vertices of said ontology and selecting those k said terms of said ontology having the k highest said second values as k said keywords representative of said electronic document.

2. A non-transitory computer program storage medium readable by a computer, tangibly embodying a program of instructions executable by said computer to perform a non-natural language processing (NLP) computer-implemented method of performing purely an ontology-based search of an electronic document by selecting keywords representative of said electronic document from an ontology, said non-NLP computer-implemented method comprising:

retrieving said electronic document;

retrieving said ontology associated with said electronic document, said ontology comprising one of a directed acyclic graph (DAG), a collection of trees, and a collection of DAGs, wherein said ontology comprises one or more root vertices, a plurality of descendent vertices, and a plurality of descendent leaves, said descendent vertices and said descendent leaves corresponding to terms in said ontology;

scanning said electronic document and computing, for each term in said ontology, a first value representative of a frequency of occurrence of said each term in said electronic document;

assigning said first value for said each term to corresponding vertices in said ontology;

propagating said first value from leaf vertices of said ontology upwards to said one or more root vertices of said ontology by assigning to each of said descendent vertices a second value, wherein said second value equals a sum of said first value of said each of said descendent vertices plus second values of immediate descendents of said each of said descendent vertices multiplied by a propagation factor, wherein said propagation factor comprises a fractional weight-propagation;

inputting an integer value, k; and traversing all said descendent leaves and all said descendent vertices of said ontology and selecting those k said terms of said ontology having the k highest said second values as k said keywords representative of said electronic document.

3. A computer system for performing purely an ontology-based search of an electronic document using non-natural language processing (NLP) by selecting keywords representative of said electronic document from an ontology, said computer system comprising:

a memory that stores said electronic document in an electronic format;

a computer processor configured to:

retrieve said electronic document;

retrieve said ontology associated with said electronic document, said ontology comprising one of a directed acyclic graph (DAG), a collection of trees, and a collection of DAGs, wherein said ontology comprises one or more root vertices, a plurality of descendent vertices, and a plurality of descendent leaves, said descendent vertices and said descendent leaves corresponding to terms in said ontology;

scan said electronic document and computing, for each term in said ontology, a first value representative of a frequency of occurrence of said each term in said electronic document;

assign said first value for said each term to corresponding vertices in said ontology;

propagate said first value from leaf vertices of said ontology upwards to said one or more root vertices of said ontology by assigning to each of said descendent vertices a second value, wherein said second value equals a sum of said first value of said each of said descendent vertices plus second values of immediate descendents of said each of said descendent vertices multiplied by a propagation factor, wherein said propagation factor comprises a fractional weight-propagation;

receive an inputted integer value, k;

traverse all said descendent leaves and all said descendent vertices of said ontology and select those k said terms of said ontology having the k highest said second values as k said keywords representative of said electronic document; and a video display configured to display said keywords as an output of a purely ontology-based search of said electronic document to a user.

* * * * *